(12) United States Patent
Wang et al.

(10) Patent No.: US 8,241,811 B2
(45) Date of Patent: Aug. 14, 2012

(54) FLOW CHANNEL PLATE

(75) Inventors: Cheng Wang, Hsinchu (TW); Nien-Hui Hsu, Hsinchu (TW); Jin-Shu Huang, Hsinchu (TW); Ching-Po Lee, Hsinchu (TW)

(73) Assignee: Young Green Energy Co., Hsinchu County (TW)

( * ) Notice: Subject to any disclaimer, the term of this patent is extended or adjusted under 35 U.S.C. 154(b) by 1325 days.

(21) Appl. No.: 11/926,103

(22) Filed: Oct. 28, 2007

(65) Prior Publication Data

US 2008/0299438 A1    Dec. 4, 2008

(30) Foreign Application Priority Data

May 31, 2007  (TW) ............................... 96119577 A

(51) Int. Cl.
 *H01M 8/10* (2006.01)
(52) U.S. Cl. .............. 429/457; 429/514; 429/518
(58) Field of Classification Search .......... 429/454–457, 429/512–514, 517–522
See application file for complete search history.

(56) References Cited

U.S. PATENT DOCUMENTS

| | | | |
|---|---|---|---|
| 5,049,459 A * | 9/1991 | Akagi | 429/486 |
| 2002/0108740 A1 | 8/2002 | Hidaka et al. | |
| 2006/0024556 A1 * | 2/2006 | Ishioka et al. | 429/37 |
| 2007/0141448 A1 * | 6/2007 | Ueda et al. | 429/44 |
| 2008/0286623 A1 * | 11/2008 | Hsu et al. | 429/26 |

FOREIGN PATENT DOCUMENTS

| | | |
|---|---|---|
| EP | 0416542 | 9/1997 |
| JP | 2007-98324 | 4/2007 |
| TW | M270506 | 7/2005 |
| TW | M273088 | 8/2005 |
| TW | I241735 | 10/2005 |
| TW | M291089 | 5/2006 |
| TW | M313321 | 6/2007 |

OTHER PUBLICATIONS

"1st Office Action of China counterpart application", issued on Oct. 16, 2009, p. 1-p. 3.
"Office Action of Taiwan Counterpart Application", issued on Dec. 8, 2010, p. 1-p. 3.

* cited by examiner

*Primary Examiner* — Thanhha Pham
(74) *Attorney, Agent, or Firm* — Jianq Chyun IP Office

(57) ABSTRACT

A flow channel plate adapted to a fuel cell apparatus is provided. The flow channel plate includes a separating film and a plurality of bar supporting members. The separating film is disposed between two components of the fuel cell apparatus, and the bar supporting members lean against the separating film and the two components to maintain a distance between the two components. The flow channel plate has low flow resistance.

15 Claims, 8 Drawing Sheets

120

114

FLOW CHANNEL PLATE

CROSS-REFERENCE TO RELATED APPLICATION

This application claims the priority benefit of Taiwan application serial no. 96119577, filed on May 31, 2007. All disclosure of the Taiwan application is incorporated herein by reference.

BACKGROUND OF THE INVENTION

1. Field of the Invention

The present invention generally relates to a fuel cell apparatus, in particular, to a flow channel plate adapted to a fuel cell apparatus.

2. Description of Related Art

Fuel cell is a next-generation power source for it has such advantages as high efficiency, low noise, and no pollution etc. Fuel cells are categorized into many different types, and the most common ones are proton exchange membrane fuel cell (PEMFC) and direct methanol fuel cell (DMFC). For example, the fuel cell module in a DMFC includes a proton exchange membrane and a cathode and an anode disposed at two sides of the proton exchange membrane.

A DMFC uses methanol-water solution as its fuel, and the chemical reaction equation thereof is:

Anode: $CH_3OH+H_2O \rightarrow CO_2+6H^++6e^-$

Cathode: $3/2O_2+6H^++6e^- \rightarrow 3H_2O$

Overall reaction: $CH_3OH+H_2O+3/2O_2 \rightarrow CO_2+3H_2O$

Referring to FIG. 1, a conventional fuel cell apparatus 100 includes two fuel cell modules 110 and a cathode flow channel plate 120. The cathode flow channel plate 120, as shown in FIG. 2A, is disposed between the two fuel cell modules 110. The cathode flow channel plate 120 transmits the gas required by the cathodic reaction. Conventionally, a fan (not shown) is used for supplying the gas into the cathode flow channel plate 120.

Each of the fuel cell modules 110 includes two membrane electrode assemblies (MEAs) 112 and an anode flow channel plate 114. The anode flow channel plate 114 is disposed between the two MEAs 112. The anode flow channel plate 114, as shown in FIG. 2B, transmits the fuel required by the anodic reaction. Besides, each of the MEA 112 includes a proton exchange membrane 112a and an anode 112b and a cathode 112c disposed at two sides of the proton exchange membrane 112a, and the anode 112b of each of the MEAs 112 is adjacent to the anode flow channel plate 114. An anode current collector 116 is disposed at one side of each of the anodes 112b, and a cathode current collector 118 is disposed at one side of each of the cathodes 112c.

Conventionally, the methods for fabricating the anode flow channel plate 114 and the cathode flow channel plate 120 includes plastic injection molding and plastic die-casting. In plastic injection molding, the thickness D1 of the thinnest parts of the anode flow channel plate 114 and the cathode flow channel plate 120 is about 0.8 mm. In plastic die-casting, the thickness D1 of the thinnest parts of the anode flow channel plate 114 and the cathode flow channel plate 120 is about 0.25 mm. In addition, the intensity of the anode flow channel plate 114 and the cathode flow channel plate 120 fabricated through plastic die-casting is lower than the intensity of the anode flow channel plate 114 and the cathode flow channel plate 120 fabricated through plastic injection molding.

The MEAs 112 have better reaction efficiency with certain compression (usually at about 30%), thus, appropriate pressure has to be supplied to the MEAs 112, and accordingly, the anode flow channel plate 114 and the cathode flow channel plate 116 have to have high intensities so that they are not damaged by the pressure. Accordingly, the anode flow channel plate 114 and the cathode flow channel plate 120 are usually fabricated through plastic injection molding in conventional technique.

However, since the design of the fuel cell apparatus 100 is going towards slimness, the thicknesses D2 and D3 of the cathode flow channel plate 120 and the anode flow channel plate 114 have to be reduced. With a fuel cell apparatus 100 used in a CD-ROM slot of a notebook PC as example, since the thickness of the CD-ROM slot is about 12.7 mm, the thickness D2 of the cathode flow channel plate 120 can be at most 1.4 mm. If the cathode flow channel plate 120 is fabricated through plastic injection molding, the thickness D1 of the thinnest part of the cathode flow channel plate 120 is 0.8 mm, therefore the maximum height H of the flow channels is only about 0.6 mm, which causes large resistance to the gas flow and accordingly reduces the reaction efficiency of the fuel cell apparatus 100. Besides, if a large fan with high power is used in order to improve the reaction efficiency of the fuel cell apparatus 100, the fan takes up too much space and consumes more energy.

Similarly, the reaction efficiency of the fuel cell apparatus 100 is reduced if the anode flow channel plate 114 is fabricated through plastic injection molding.

SUMMARY OF THE INVENTION

Accordingly, the present invention is directed to a flow channel plate for improving the reaction efficiency of a fuel cell apparatus.

These and other features, aspects, and advantages of the present invention will be described and become more apparent from the detailed description of exemplary embodiments when read in conjunction with accompanying drawings.

According to an embodiment of the present invention, a flow channel plate adapted to a fuel cell apparatus is provided. The flow channel plate includes a separating film and a plurality of bar supporting members. The separating film is disposed between two components of the fuel cell apparatus, and the bar supporting members lean against the separating film and the two components to maintain a distance between the two components.

According to another embodiment of the present invention, a flow channel plate adapted to a fuel cell apparatus is provided. The flow channel plate includes a separating film, a first supporting member, and a second supporting member. The separating film is disposed between two components of the fuel cell apparatus, and the separating film has a first surface and a second surface. The first supporting member includes a first bottom and a plurality of first branches connecting the first bottom. The first branches are disposed on the first surface, and the first bottom is at a distance from the separating film. The second supporting member includes a second bottom and a plurality of second branches connecting the second bottom. The second branches are disposed on the second surface, and the second bottom is opposite to the first bottom and is at a distance from the separating film. The first and the second branches are arranged alternatively. The second branches are at a distance from the first bottom, and the first branches are at a distance from the second bottom. The first and the second branches are located on roughly the same surface for forming a sinuous flow channel between the separating film and each of the components.

According to the present invention, a flow channel plate includes a separating film and supporting members. The supporting members are used for withstanding the compressing pressure so that the flow channel plate is not damaged by the pressure. Moreover, compared to the conventional technique, the thickness of the separating film in the present invention is thinner, thus, the gas flowing space in the flow channel plate is considerably increased and accordingly the reaction efficiency of the fuel cell apparatus is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
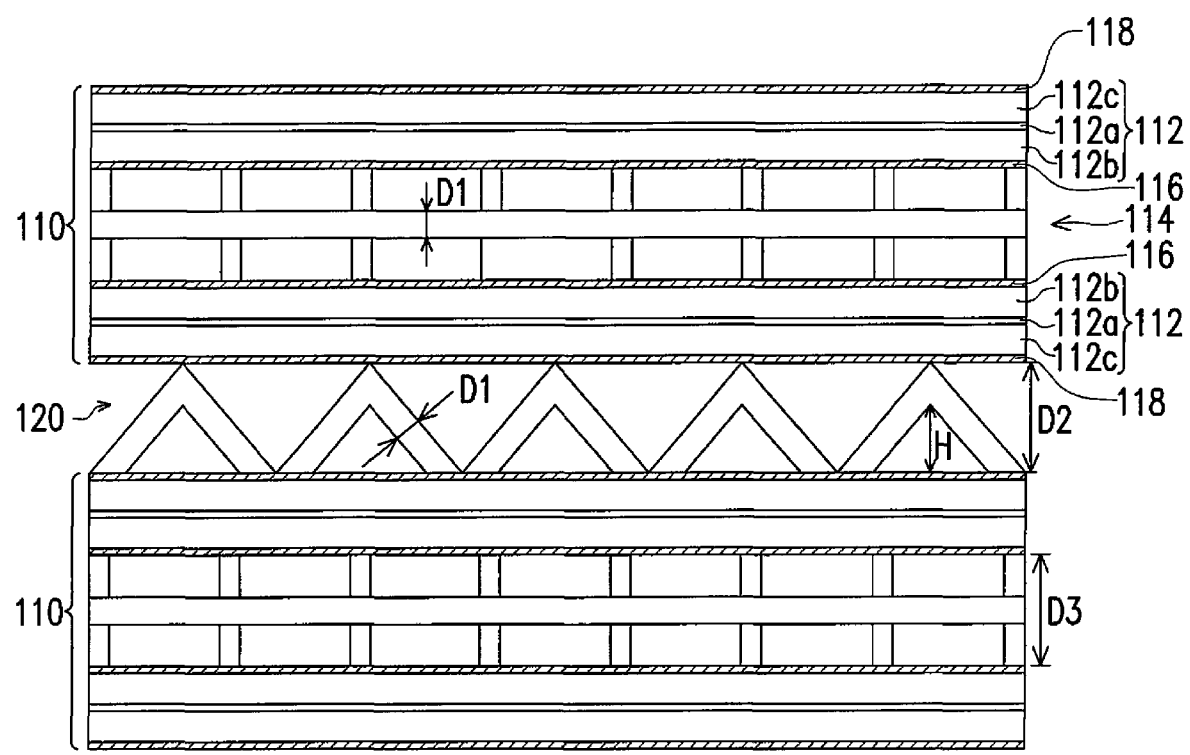
FIG. 1 is a diagram of a conventional fuel cell apparatus.
Figure 2A:
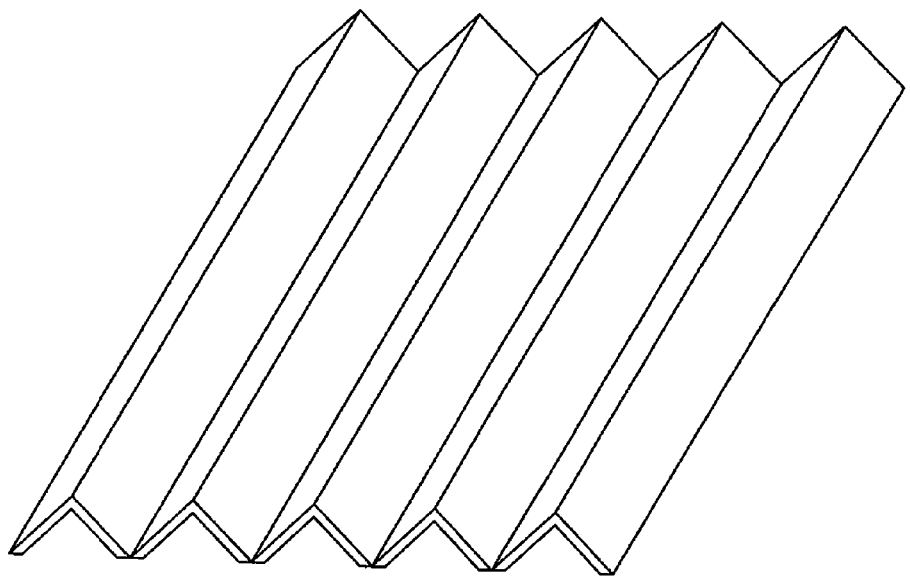
FIG. 2A is a perspective view of a cathode flow channel plate in FIG. 1.
Figure 2B:
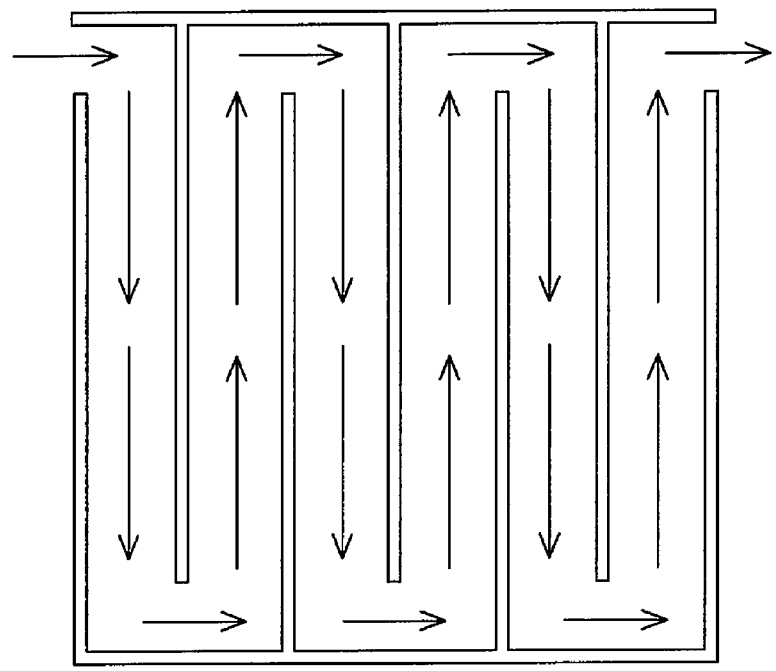
FIG. 2B is a diagram of an anode flow channel plate in FIG. 1.
Figure 3:
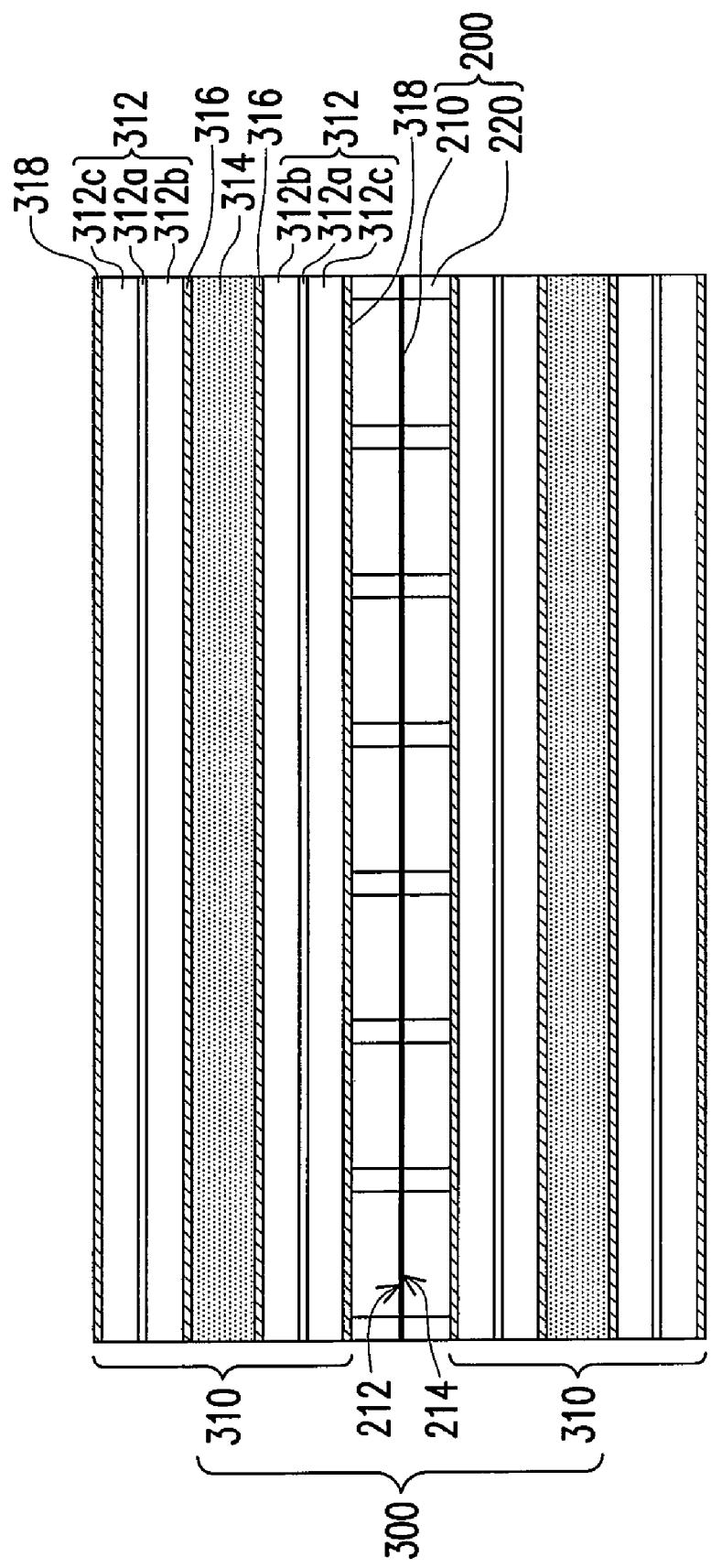
FIG. 3 is a diagram illustrating the application of a flow channel plate to a fuel cell apparatus according to an embodiment of the present invention.
Figure 4:
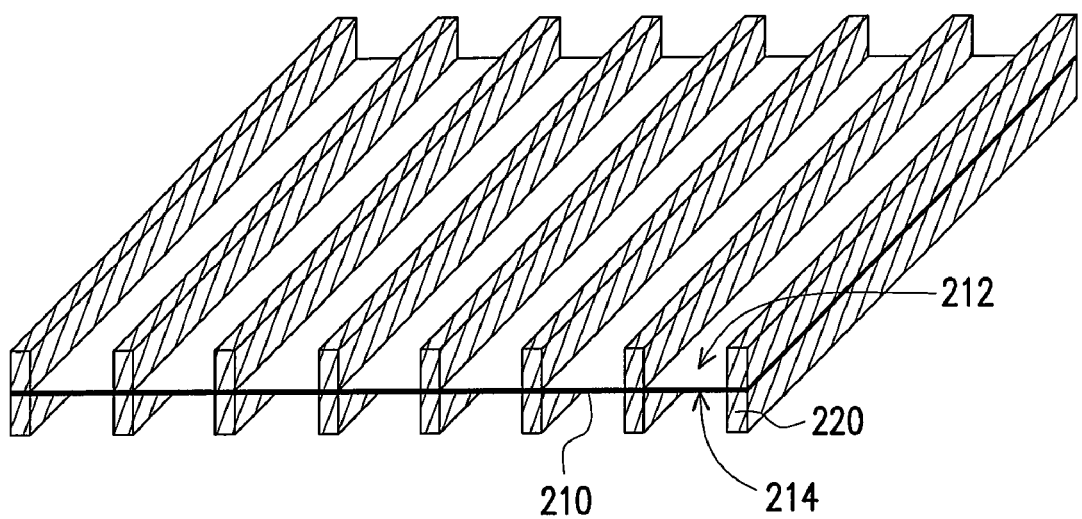
FIG. 4 is a diagram of the flow channel plate in FIG. 3.

Referring to FIG. 3 and FIG. 4, in an embodiment of the present invention, a flow channel plate 200 is disposed between two components of a fuel cell apparatus 300. The flow channel plate 200 serves as a cathode flow channel plate or an anode flow channel plate, and only a cathode flow channel plate is used in following description as an example.

When the flow channel plate 200 serves as a cathode flow channel plate, the two components are two fuel cell modules 310 of the fuel cell apparatus 300. Namely, the flow channel plate 200 is disposed between the two fuel cell modules 310. To be specific, each of the fuel cell modules 310 includes two membrane electrode assemblies (MEAs) 312 and an anode flow channel plate 314. The anode flow channel plate 314 is disposed between the two MEAs 312 for transmitting the fuel required by the anodic reaction. Besides, each of the MEAs 312 includes a proton exchange membrane 312a, and an anode 312b and a cathode 312c disposed at two sides of the proton exchange membrane 312a, and the anode 312b of each of the MEAs 312 is adjacent to the anode flow channel plate 314. An anode current collector 316 is disposed at one side of the anode 312b, and a cathode current collector 318 is disposed at one side of the cathode 312c.

The flow channel plate 200 is disposed, for example, between the two cathode current collectors 318 of the two fuel cell modules 310. Besides, the flow channel plate 200 includes a separating film 210 and a plurality of bar supporting members 220. The separating film 210 is disposed between the two fuel cell modules 310, and the bar supporting members 220 lean against the separating film 210 and the fuel cell modules 310 to maintain a distance between the two fuel cell modules 310. To be specific, the bar supporting members 220 are bar supports, for example, and the bar supporting members 220 are disposed on two surfaces 212 and 214 of the separating film 210.

As described above, a thickness of the separating film 210 is smaller than a thickness of each of the bar supporting members 220, and the thickness of the separating film 210 is smaller than 0.25 mm. In addition, a hardness of each of the bar supporting members 220 is greater than a hardness of the separating film 210. The separating film 210 is a plastic thin film or a metal thin film. If the separating film 210 is made of a metal thin film, the metal thin film is bent to a corrugated shape by a bending machine; the material of the metal thin film is stainless steel, and an anticorrosive material such as carbon tetrafluoride (CF4) is coated over the surface of the metal thin film.

Compared to the conventional flow channel plate fabricated through plastic injection molding, the separating film 210 of the flow channel plate 200 in the present embodiment is thinner, and the thickness of the separating film 210 is be lower than 0.25 mm. Thus, the gas flowing space in the flow channel plate 200 is larger, and accordingly the resistance to the reactive gas is smaller, therefore a smaller fan with lower power is used for supplying the gas required by the cathodic reaction into the flow channel plate 200. Accordingly, the volume of the fuel cell apparatus 300 is reduced and the output power thereof is improved.

On the other hand, compared to the conventional flow channel plate fabricated through plastic die-casting, in the present embodiment, the bar supporting members 220 increases the intensity of the flow channel plate 200 so that the flow channel plate 200 is not damaged by the compressing pressure.

It should be mentioned that that since the product of the cathodic reaction is water, the material of the separating film 210 includes poly tetrafluoroethylene (PTFE). PTFE is liquid repellent, thus, the water drops on the separating film 210 is easily drained out of the flow channel plate 200 along with the gas flowing in the flow channel plate 200. In addition, a liquid-repelling layer (not shown) is disposed on a surface of the separating film 210 if the material of the separating film 210 does not include PTFE, so that the water drops on the separating film 210 is easily drained out of the flow channel plate 200 along with the gas flowing in the flow channel plate 200. The material of the liquid-repelling layer includes TiO2.

In the present invention, the separating film 210 of the flow channel plate 200 is not limited to a plane separating film. Other embodiments of flow channel plate in the present invention will be described below, and the advantages of these flow channel plates are similar to those of the flow channel plate 200, therefore only the structural differences are described herein, and like reference numerals refer to the like elements throughout.

Figure 5:
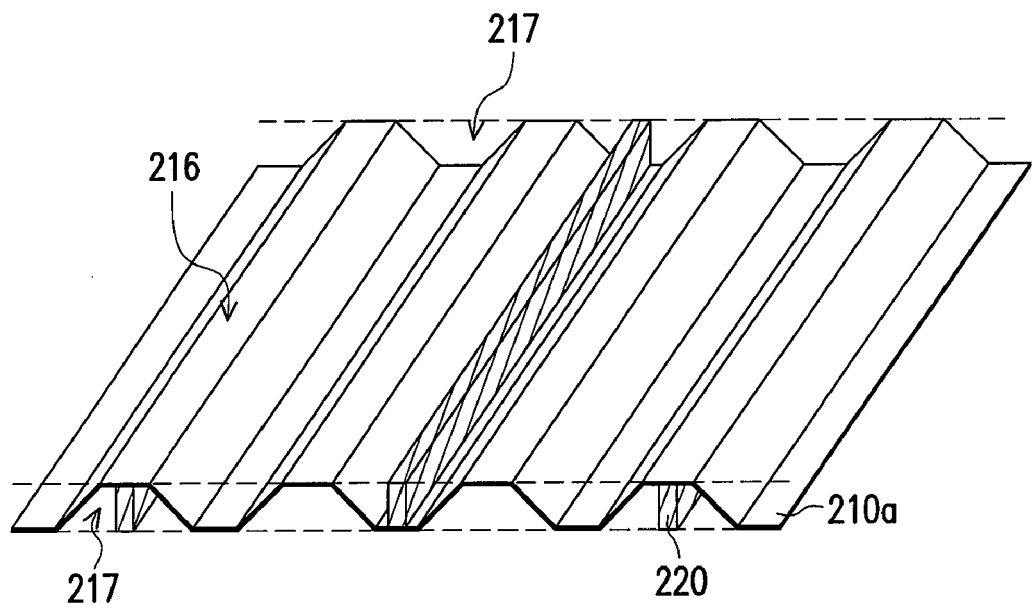
FIG. 5 is a diagram of a flow channel plate according to another embodiment of the present invention.

Referring to FIG. 5, according to another embodiment of the present invention, a separating film 210a of a flow channel plate 200a has a plurality of protrusions 216 for forming a plurality of flow channels 217 between the separating film 210a and each of the fuel cell modules (not shown). The bar supporting members 220 are disposed inside at least some of the flow channels 217, and extension directions of the bar supporting members 220 are substantially parallel to extension directions of the flow channels 217. Besides, each of the bar supporting members 220 is leaned against one of the fuel cell modules and the separating film 210a.

Figure 6:
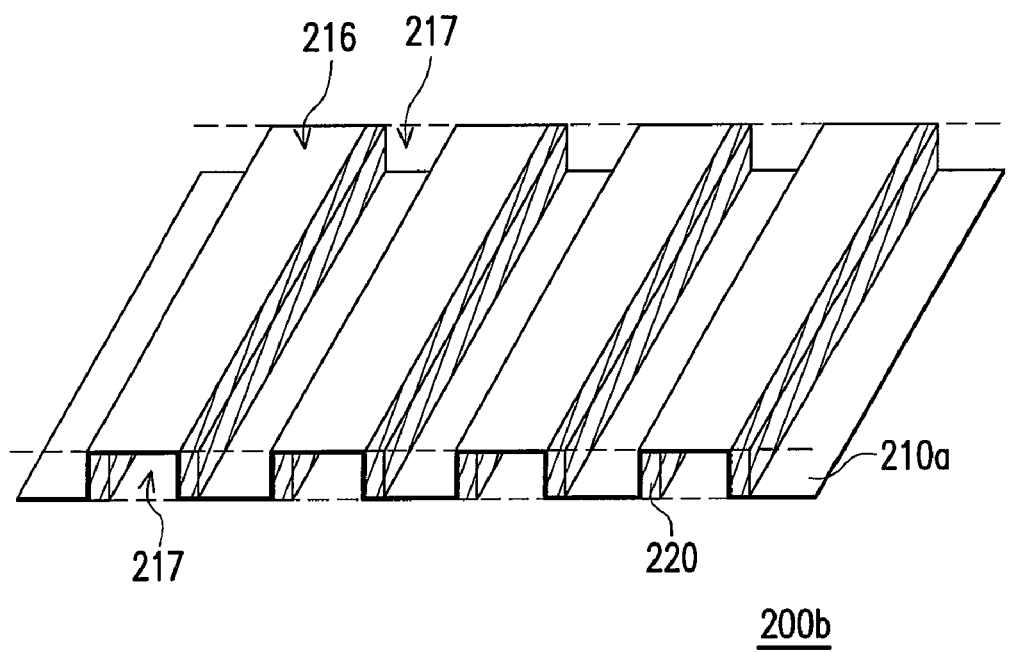
FIG. 6 is a diagram of a flow channel plate according to another embodiment of the present invention.
Figure 7A:
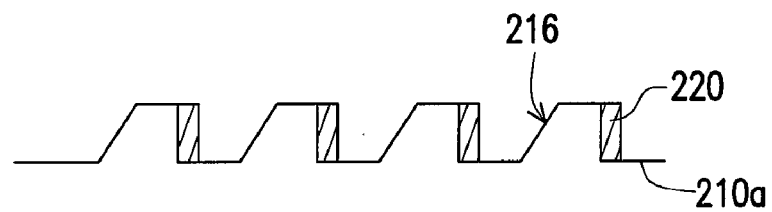
FIGS. 7A~7C are diagrams of flow channel plates according to another three embodiments of the present invention.
Figure 7B:
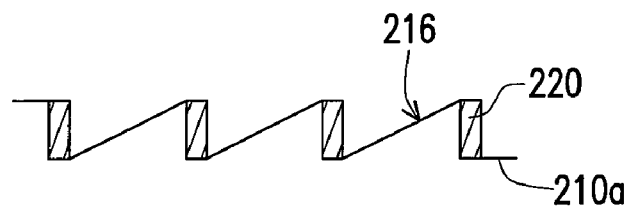
Figure 7C:
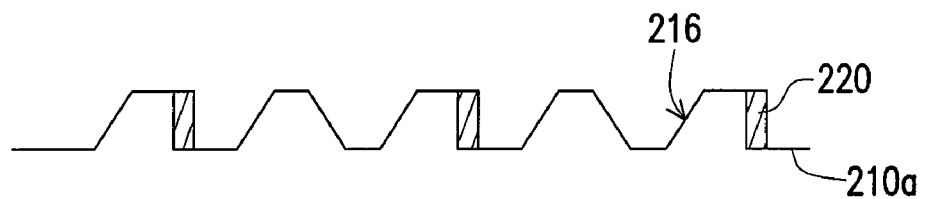

Referring to FIG. 6, the difference between a flow channel plate 200b in another embodiment of the present invention and the flow channel plate 200a in FIG. 5 is that the bar supporting members 220 of the flow channel plate 200b are connected to sidewalls of at least some of the flow channels 217. In addition, in the present embodiment, the shapes of the protrusions 216 of the separating film 210a are not restricted, which are the shapes illustrated in FIGS. 7A~7C but not limited thereto.

Figure 8:
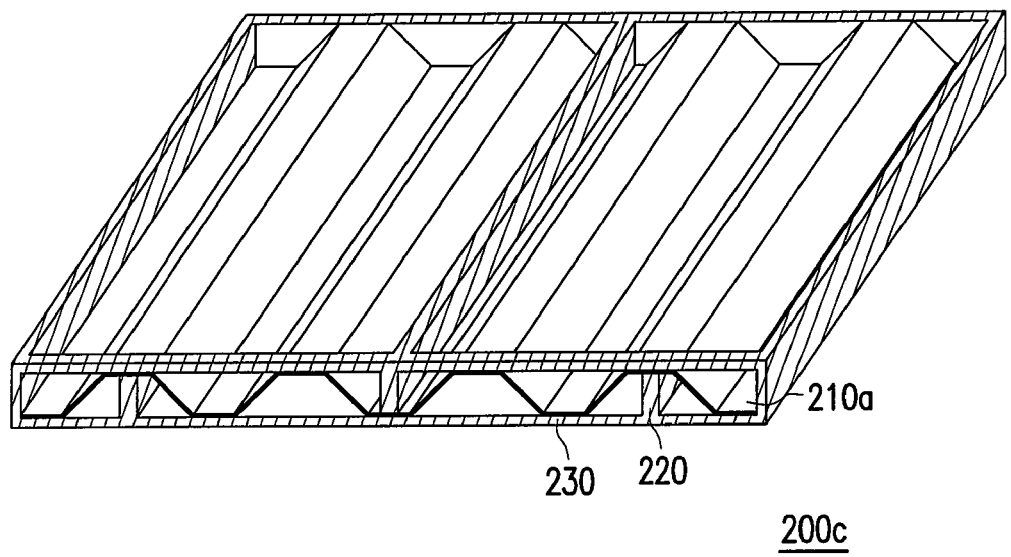
FIG. 8 is a diagram of a flow channel plate according to another embodiment of the present invention.

Referring to FIG. 8, compared to the flow channel plate 200a in FIG. 5, a flow channel plate 200c in another embodiment of the present invention further includes a frame 230, and the bar supporting members 220 are connected to the frame 230. The bar supporting members 220 and the frame 230 are formed integrally.

Figure 9:
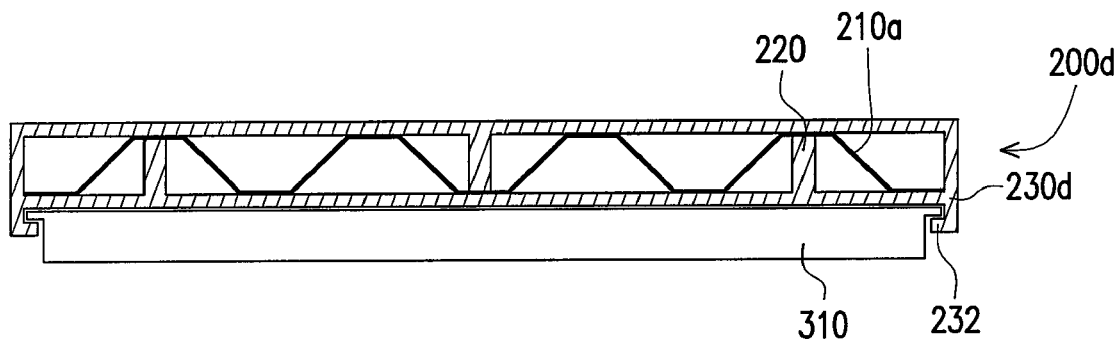
FIG. 9 is a diagram of a flow channel plate according to another embodiment of the present invention.

Referring to FIG. 9, compared to the flow channel plate 200c in FIG. 8, a frame 230d of a flow channel plate 200d in another embodiment of the present invention is disposed with a plurality of lock clasps 232. Thus, the flow channel plate 200d and the fuel cell modules 310 are assembled easily.

Figure 10:
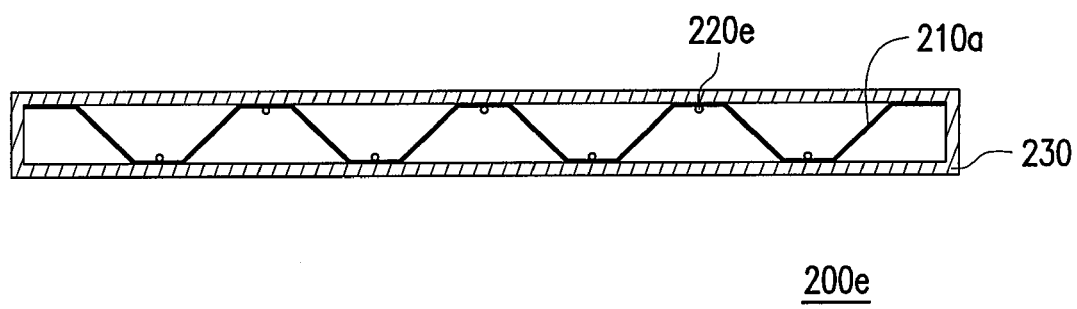
FIG. 10 is a diagram of a flow channel plate according to another embodiment of the present invention.

Referring to FIG. 10, a flow channel plate 200e in another embodiment of the present invention is similar to the flow channel plate 200c in FIG. 8, and the difference between the two is that the bar supporting members 220e of the flow channel plate 200e are supporting lines. The bar supporting members 220e lean against the separating film 210a, and two ends of each of the bar supporting members 220e are fastened to the frame 230. In addition, the supporting lines 220e are wires but are not limited thereto.

Figure 11:
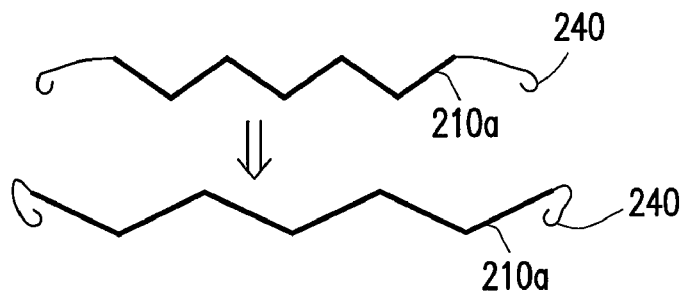
FIG. 11 is a diagram of a separating film according to another embodiment of the present invention.

Referring to FIG. 11, according to another embodiment of the present invention, a plurality of lock clasps 240 is further disposed at an edge of a separating film 210a, and positioning holes are further disposed at appropriate positions in the fuel cell apparatus so that the lock clasps 240 are locked into the positioning holes. Since the material of the separating film 210a is soft plastic thin film, the separating film 210a is elastic, and accordingly the separating film 210a also turns into a desired shape after the lock clasps 240 are locked into the positioning holes.

Figure 12A:
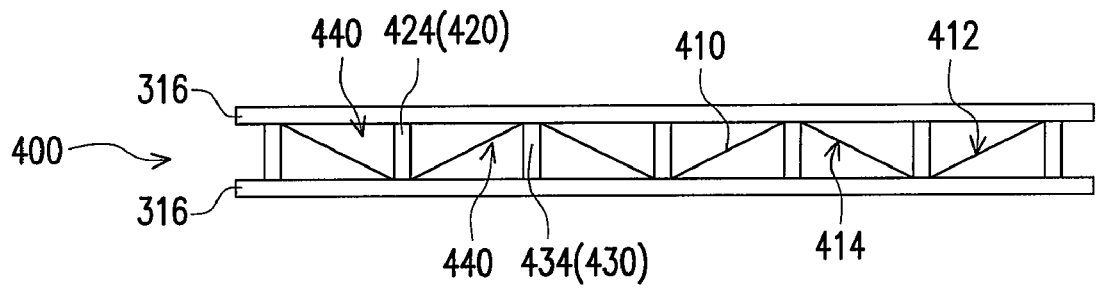
FIG. 12A is a diagram of a flow channel plate according to another embodiment of the present invention.
Figure 12B:
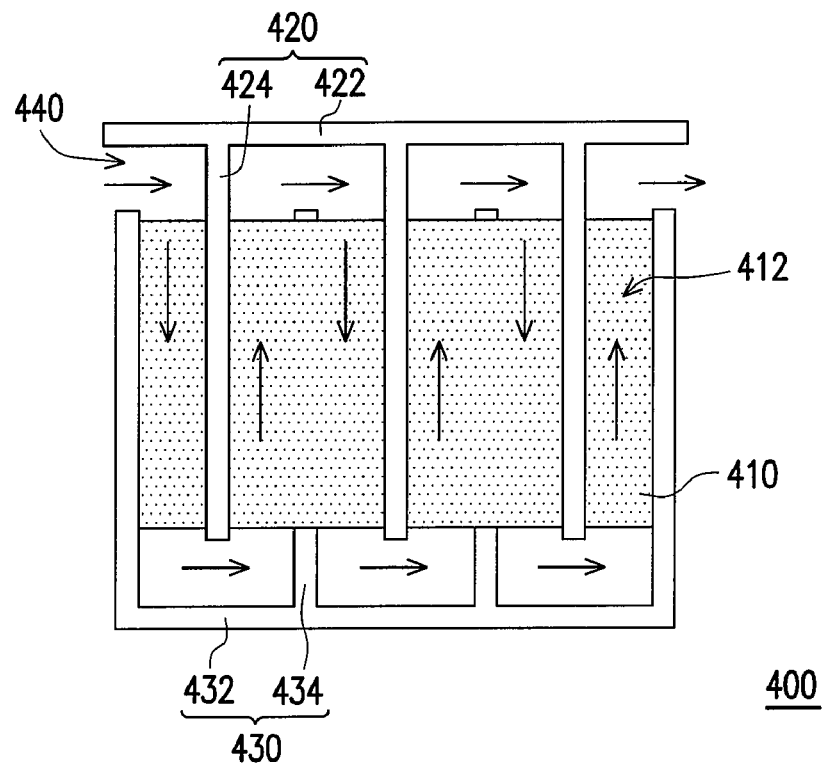
FIG. 12B is a top view of the flow channel plate in FIG. 12A.

Referring to FIG. 12A and FIG. 12B, according to another embodiment of the present invention, a flow channel plate 400 is disposed between two components of a fuel cell apparatus. The flow channel plate 400 serves as a cathode flow channel plate or an anode flow channel plate, and an anode flow channel plate is used in following description as example.

The flow channel plate 400 is disposed at the same position as the anode flow channel plate 314 illustrated in FIG. 3 when the flow channel plate 400 serves as an anode flow channel plate, namely, the flow channel plate 400 is disposed between the two anode current collectors 316 of the fuel cell modules 310 in FIG. 3. In other words, foregoing components are the anode current collectors 316. The flow channel plate 400 includes a separating film 410, a first supporting member 420, and a second supporting member 430. The separating film 410 has a first surface 412 and a second surface 414. The first supporting member 420 includes a first bottom 422 and a plurality of first branches 424 connecting the first bottom 422. The first branches 424 are disposed on the first surface 412, and the first bottom 422 is at a distance from the separating film 410. The second supporting member 430 includes a second bottom 432 and a plurality of second branches 434 connecting the second bottom 432. The second branches 434 are disposed on the second surface 414, and the second bottom 432 is opposite to the first bottom 422 and is at a distance from the separating film 410. The first branches 424 and the second branches 434 are arranged alternatively, the second branches 434 are at a distance from the first bottom 422, and the first branches 424 are at a distance from the second bottom 432. The first branches 424 and the second branches 434 are located on roughly the same surface for forming a sinuous flow channel 440 between the separating film 410 and each of the anode current collectors 316.

In foregoing flow channel plate 400, hardness of the first supporting member 420 and the second supporting member 430 is greater than hardness of the separating film 410.

Besides, thicknesses of the first supporting member 420 and the second supporting member 430 are greater than thicknesses of the separating film 410. The thickness of the separating film 410 is smaller than 0.25 mm. In addition, the separating film 210 is a plastic thin film or a metal thin film. The material of the first supporting member 420 and the second supporting member 430 are a solution resistant material such as FR4 or FR5.

Compared to the conventional anode flow channel plate fabricated through plastic injection molding, the separating film 410 of the flow channel plate 400 in the present embodiment is thinner, and the thickness of the separating film 410 is lower than 0.25 mm. Thus, the gas flowing space in the flow channel plate 400 is larger and accordingly the resistance to the reactive gas is smaller, therefore a smaller pump with lower power is used for supplying the gas required by the anodic reaction into the flow channel plate 400. Accordingly, the volume of the fuel cell module is reduced and the output power thereof is improved.

On the other hand, compared to the conventional anode flow channel plate fabricated through plastic die-casting, in the present embodiment, the first supporting member 420 and the second supporting member 430 increases the intensity of the flow channel plate 400 so that the flow channel plate 400 is not damaged by the compressing pressure.

Figure 13A:
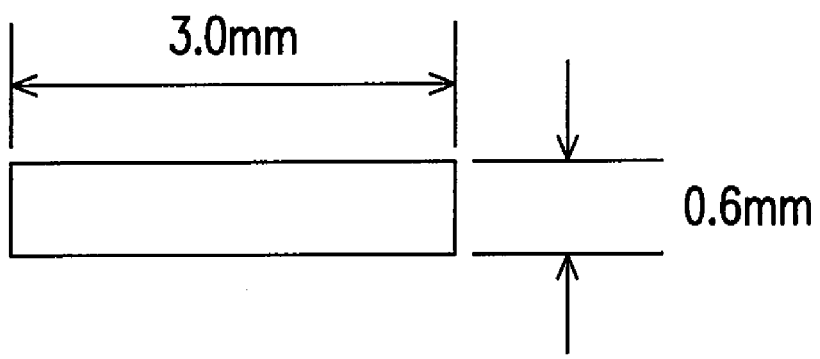
FIG. 13A is a diagram illustrating the size of a flow channel on a conventional anode flow channel plate.
Figure 13B:
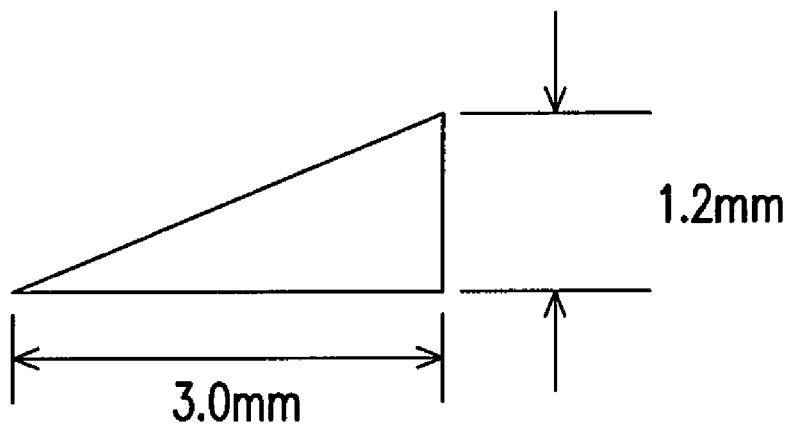
FIG. 13B is a diagram illustrating the size of a flow channel on a flow channel plate in FIG. 12A.

FIG. 13A is a diagram illustrating the size of a flow channel on a conventional anode flow channel plate, and FIG. 13B is a diagram illustrating the size of a flow channel on a flow channel plate in FIG. 12A. Referring to FIG. 13A and FIG. 13B, if the widths of the conventional flow channel and the flow channel in the present embodiment are both 3 mm, the height of the conventional flow channel is 0.6 mm, and the height of the flow channel in the present embodiment is 1.2 mm, then the cross-sectional areas of the conventional flow channel and the flow channel in the present embodiment are the same. When the lengths of the two flow channels are both 100 mm and the flux per minute are both 100 ml, the flow resistance of the conventional flow channel is 3155pa, and the flow resistance of the flow channel in the present embodiment is 1241pa. In other words, the flow resistance of the flow channel in the present embodiment is only about 39% of that of the conventional flow channel.

Thus, when the flow resistances of the conventional flow channel and the flow channel in the present embodiment are the same, the height of the flow channel in the present embodiment is much lower than that of the conventional flow channel, which reduces the thickness of the entire fuel cell apparatus. In addition, compared to the conventional technique, the fuel cell module adopting the flow channel plate 400 in the present embodiment has higher volumetric energy density (Wh/L).

In overview, the flow channel plate provided by the present invention has one, part, or all of the following advantages:

1. compared to the conventional technique, the separating film in the present invention is thinner, thus, the gas flowing space in the flow channel plate is effectively increased, and accordingly the reactive efficiency of the fuel cell apparatus is improved;

2. the supporting members prevent the flow channel plate from being damaged by the compressing pressure;

3. with the same flow resistance, the flow channel plate in the present invention is thinner than the conventional flow channel plate.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A flow channel plate, adapted to a fuel cell apparatus, the flow channel plate comprising:
a separating film, disposed between two components of the fuel cell apparatus, and a layer of anticorrosive material is disposed on a surface of the separating film, wherein the anticorrosive material is carbon tetrafluoride (CF4); and
a plurality of bar supporting members, leaning against the separating film and the components for maintaining a distance between the components.

2. The flow channel plate according to claim 1, wherein the separating film has a plurality of protrusions for forming a plurality of flow channels between the separating film and each of the components, the bar supporting members are disposed in at least some of the flow channels, and extension directions of the bar supporting members are substantially parallel to extension directions of the flow channels.

3. The flow channel plate according to claim 2, wherein the bar supporting members comprise a plurality of bar supports, and each of the bar supports leans against one of the components and the separating film.

4. The flow channel plate according to claim 3, wherein the bar supporting members are connected to sidewalls of at least some of the flow channels.

5. The flow channel plate according to claim 2 further comprising a frame, wherein the bar supporting members are connected to the frame.

6. The flow channel plate according to claim 5, wherein the bar supporting members comprise a plurality of supporting lines leaning against the separating film, and two ends of each of the supporting lines are fastened to the frame.

7. The flow channel plate according to claim 5, wherein the frame is disposed with a plurality of lock clasps.

8. The flow channel plate according to claim 1, wherein a thickness of the separating film is smaller than 0.25 mm.

9. The flow channel plate according to claim 1, wherein a hardness of each of the bar supporting members is greater than a hardness of the separating film.

10. The flow channel plate according to claim 1, wherein the separating film is a metal thin film.

11. The flow channel plate according to claim 1, wherein the separating film is a plastic thin film.

12. The flow channel plate according to claim 1, wherein the material of the separating film comprises poly tetrafluoroethylene (PTFE).

13. The flow channel plate according to claim 1, wherein a liquid-repelling layer is disposed on a surface of the separating film.

14. The flow channel plate according to claim 1, wherein a plurality of lock clasps is disposed at an edge of the separating film.

15. The flow channel plate according to claim 1, wherein the fuel cell apparatus comprises two fuel cell modules, each of the fuel cell modules comprises two membrane electrode assemblies (MEAs) and an anode flow channel plate, and the flow channel plate is disposed between the two fuel cell modules.

* * * * *